(12) United States Patent
Charych

(10) Patent No.: US 7,236,851 B2
(45) Date of Patent: *Jun. 26, 2007

(54) SELF-CONTAINED RF IDENTIFICATION APPARATUS FOR PALLET CONVEYANCES

(75) Inventor: Harold Charych, Poquott, NY (US)

(73) Assignee: EPC4ROI Limited Partnership, Poquott, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 11/244,590

(22) Filed: Oct. 6, 2005

(65) Prior Publication Data

US 2006/0287759 A1 Dec. 21, 2006

Related U.S. Application Data

(63) Continuation-in-part of application No. 11/155,054, filed on Jun. 17, 2005, now Pat. No. 7,155,304.

(51) Int. Cl.
*G06F 7/00* (2006.01)

(52) U.S. Cl. .................... 700/214; 700/213

(58) Field of Classification Search ............ 700/213, 700/214; 343/711, 723, 883, 901
See application file for complete search history.

(56) References Cited

U.S. PATENT DOCUMENTS

| 6,573,868 | B2 * | 6/2003 | Johnson et al. .............. 343/702 |
| 6,600,418 | B2 | 7/2003 | Francis et al. ............. 340/572.1 |
| 6,669,089 | B2 | 12/2003 | Cybulski et al. ............. 235/385 |
| 2005/0071234 | A1 | 3/2005 | Schon ......................... 705/22 |
| 2006/0036346 | A1 * | 2/2006 | Andersen et al. ............ 700/213 |
| 2006/0058913 | A1 * | 3/2006 | Andersen et al. ............ 700/214 |

* cited by examiner

*Primary Examiner*—Khoi H. Tran
(74) *Attorney, Agent, or Firm*—Brown + Michaels, PC

(57) ABSTRACT

An RFID reading apparatus includes a frame. The RFID reading apparatus also includes an RFID interrogator, coupled to the frame, for triggering transponders in picked cases and receiving and decoding replies. The RFID reading apparatus further includes at least one vertically movable antenna mount coupled to the frame, at least one antenna mounted to the antenna mount and coupled to the interrogator, and at least one object sensor adjacent to at least one antenna. The RFID reading apparatus also includes a control unit coupled to the interrogator for initiating interrogation of transponders and accepting decoded replies, to the antenna mount for controlling the level of the antenna mounted on the mount, and to the object sensor for detecting the presence of cases adjacent to the object sensor.

35 Claims, 8 Drawing Sheets

# SELF-CONTAINED RF IDENTIFICATION APPARATUS FOR PALLET CONVEYANCES

REFERENCE TO RELATED APPLICATIONS

This is a continuation-in-part of patent application Ser. No. 11/155,054, entitled "RF Identification Apparatus for Pallet Conveyances" filed Jun. 17, 2005 now U.S. Pat. No. 7,155,304. The aforementioned application is hereby incorporated herein by reference.

FIELD OF THE INVENTION

The invention pertains to the field of registers for reading and displaying data pertaining to cases. More particularly, the invention pertains to apparatus and methods for identifying and tracking picked cases on a pallet conveyance using RF identification transponders (RFID tags) associated with the cases.

DESCRIPTION OF RELATED ART

Pallets are a cost effective means used to ship products from the point of manufacture to distribution centers and finally to retailers where the merchandise is sold to the general public. Retailers need to know what cases are in the supply chain in order to make better business decisions and to make sure that products are on the store shelves when consumers want to purchase them. Mandates from major retailers such as Wal-Mart, Target, Best Buy, Metro, and others are requiring that cases, cartons, and shipping totes, primarily shipped on pallets (hereinafter, simply "cases"), have Radio Frequency Identification transponders, commonly called "RFID tags" attached to identify the product content.

Manufacturers and distribution centers receive orders from stores for a variety of merchandise. The order is typically "picked" which means that a manufacturer or distribution center uses a pallet that is carried on the forks of a pallet conveyance, which may be a forklift truck, motorized pallet jack, manual pallet jack, or other such vehicle, onto which cases from a "pick list" are loaded for delivery to a given location. The operator will move the pallet via the conveyance to an area of the warehouse where merchandise listed on the pick list is stored. The operator will then add the number of cases listed on the pick list to the pallet. This pallet will now be called the "picked pallet", and the cases "picked cases".

The manufacturer or the distribution center would like to know that the right cases were loaded onto the picked pallet. Prior art used barcodes read with a handheld barcode scanner as a way to insure accuracy. As each case is added to the picked pallet, the barcode printed on the case is scanned with a hand held scanner. A computer system is used to check that the right cases were picked. This process is time consuming and depends on the operator to manually scan each case.

Prior art, such as U.S. Pat. No. 6,669,089, describes methods of reading an RFID tag on one or more pallets loaded on the forks of the forklifts. The patent does not address a method of reading RFID tags on individual cases loaded onto pallets. The antennas in this patent are fixed to the forklift structure (either to the moving fork structure, or the fixed vertical support), and are not independently movable apart from the normal raising and lowering of the forks.

Reading the RFID tags attached to cases as they are loaded onto a picked pallet has proven to be difficult using prior art. The operator can park the forklift or other pallet conveyance vehicle with the picked pallet anywhere in the warehouse. Because the RF field generated by the RFID reader and antenna is imprecise and may bounce off metallic objects in the warehouse, such as the metal shelves, it is difficult to know if the case is on the picked pallet or near it. As cases are loaded onto the picked pallet, antennas that were visible before are now covered with cases. Depending on the contents of the cases, the RF signal from the reader will become blocked and no additional RFID tag reading will take place.

Published Patent Application no. 2005/0071234 describes a pallet picking operation in detail. The application makes the assumption that if there is an RFID reader it will read the tag of items placed on the pallet, but does not discuss the placement of the RFID reader antennas with respect to the RFID tags on the cases. This location and proximity between the tags and the antennas is critical if the tags are going to be read correctly—or at all. As an example, paragraph 0016 states "Once on the pallet the RF reader for the pallet identifies the item and logs the item into the pallet's inventory. At the same time the forklift's RF reader reads the RF tag of the item and identifies the item in the pick list". This requires knowing the location of the antennas of the forklift RF reader, and the location of the antennas of the pallet RF reader. The forklift is a metallic structure and RF waves from the forklift may be blocked in many cases. The pallet and forklift RF readers and antennas are not described at all.

SUMMARY

The invention is an apparatus that will read the RF identification transponders (RFID tags) of picked cases as they are loaded onto the picked pallet, and a method of picking and tracking pallets using the device. Errors are reduced and the picking process can be accomplished much faster.

The invention may be removably installed on a pallet support of a pallet conveyance such as a forklift, pallet jack, or the like, having pallet supports (such as the "forks" of a forklift) which engage the pallet. The apparatus has an RFID interrogator for triggering the RFID transponders on picked cases and receiving and decoding-replies.

An RFID reading apparatus includes a frame. The RFID reading apparatus also includes an RFID interrogator, coupled to the frame, for triggering transponders in picked cases and receiving and decoding replies. The RFID reading apparatus further includes at least one vertically movable antenna mount coupled to the frame, at least one antenna mounted to the antenna mount and coupled to the interrogator, and at least one object sensor adjacent to at least one antenna. The RFID reading apparatus also includes a control unit coupled to the interrogator for initiating interrogation of transponders and accepting decoded replies, to the antenna mount for controlling the level of the antenna mounted on the mount, and to the object sensor for detecting the presence of cases adjacent to the object sensor.

DETAILED DESCRIPTION OF THE INVENTION

Examples of Use

The forklift RFID reading apparatus of the invention is self contained, easily installable on a forklift, and easily removable from a forklift. By."self-contained", it is meant that the forklift RFID reading apparatus is not integral to the forklift. The RFID reading apparatus may receive electrical power and/or communicate electronically either by wired and/or wireless methods with the forklift or other controllers and/or power sources. The RFID reading apparatus may be removably installed and used on any number of pallet conveyances including forklifts, stock pickers, motorized pallet jacks, manual pallet jacks, clamp trucks, and other conveyances that have forks that engage the pallet or pick up a load by clamping it from the sides. In the description below these pallet conveyances may be referred to as "forklifts" or "fork trucks", but it will be understood that any such conveyance is possible.

Figure 1:
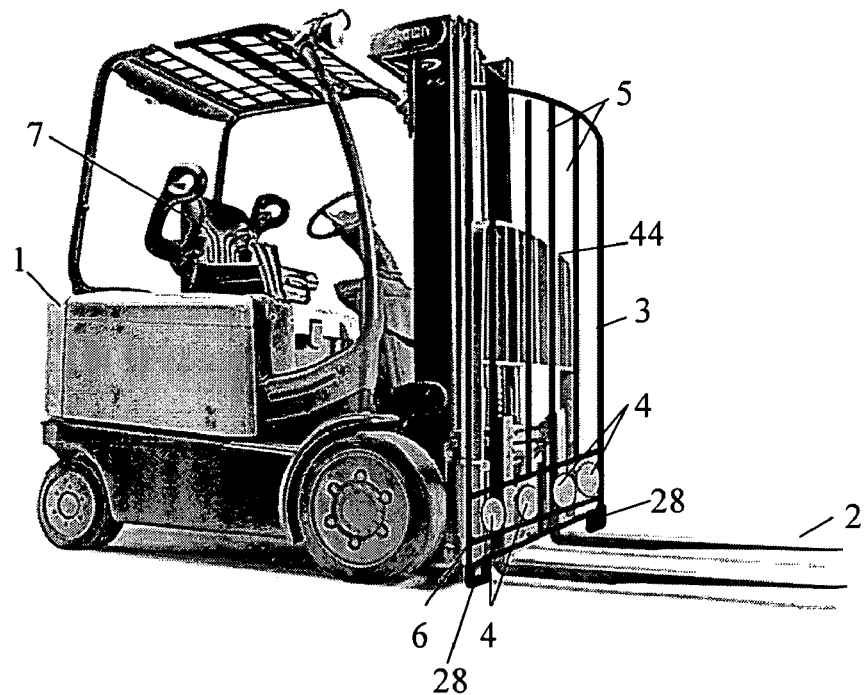
FIG. 1 shows a forklift having an embodiment of an RFID reading apparatus removably installed on its forks.

FIG. 1 shows how an embodiment of the invention might be removably installed upon a forklift truck (1), which has a vertically movable set of pallet forks (2) mounted on its front end. The forks (2) may be slipped underneath a pallet, which is a flat support for cases having space underneath for the forks. Such forklifts (1) are typically driven by an operator seated (7) on the vehicle, although some, often referred to as "stock pickers," have the driver's position on the fork portion, so that the operator can ride up with the forks to move cases from the upper levels of a warehouse.

Figure 2A:
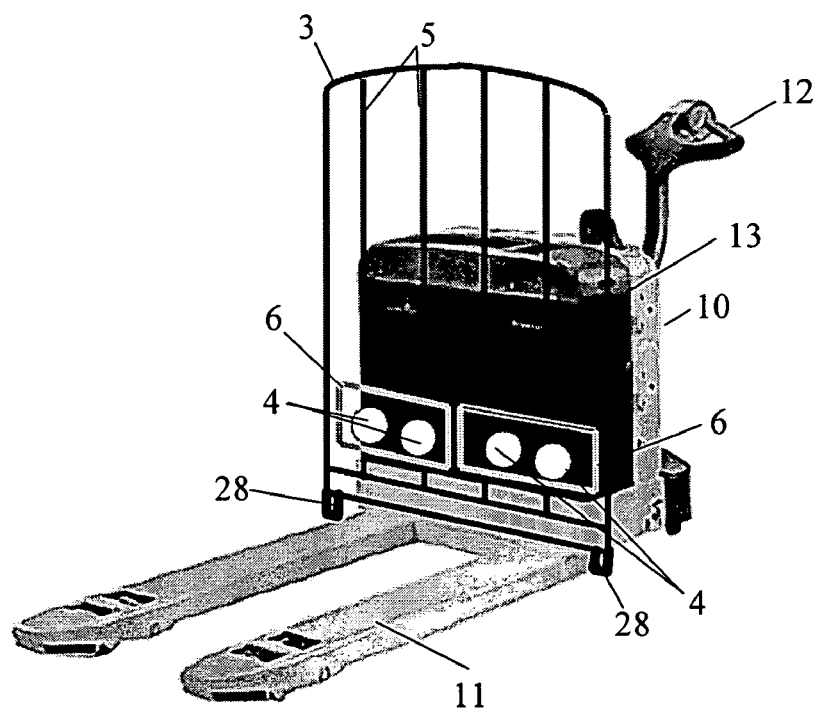
FIG. 2a shows a motorized pallet jack or pallet truck having an embodiment of an RFID reading apparatus removably installed on its forks.

FIG. 2a shows an embodiment of the invention as it might be removably installed on a motorized pallet jack (10). The jack has forks (11) to slip under pallets, and is moved by motors controlled by an operator walking with the truck, operating and steering with controls on a handle (12).

Figure 2B:
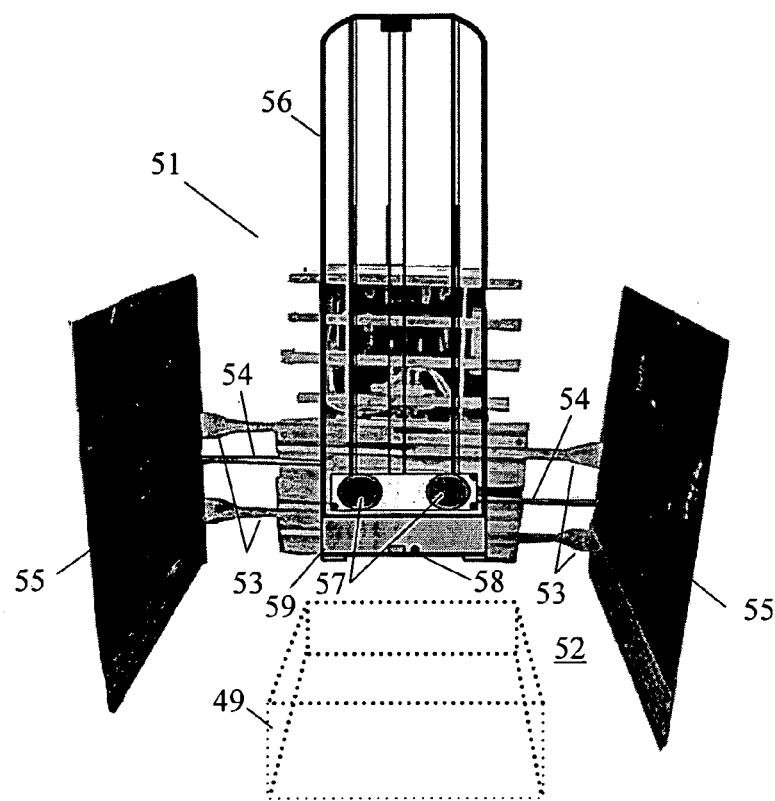
FIG. 2b shows a clamp truck having an embodiment of an RFID reading apparatus removably installed within the clamps.

FIG. 2b shows a clamp truck (51) using an embodiment of the apparatus. This embodiment has only one riser (56) and would preferably be approximately 20 inches wide. It would be mounted inside of the clamp area (52) attached to the horizontal bars (53). The hydraulic cylinders (54) that control the clamping prevent the two clamps (55) from getting any closer than a given distance (usually about 22 inches) so the apparatus will not interfere with any normal clamp operation. The apparatus' antennas (57) would preferably be slightly angled out to create a wider RF field of view. The pallet engagement sensor (58), which in this case would be the stack engagement sensor, would detect a stack (49) enclosed by the clamps (55), allowing the RF field to read cases as the clamps (55) are enclosing the stack. The antennas (57), mounted on the antenna mount (59), would rise up and go to the top of the load (49). The clamps (55) themselves may act an internal RF reflector allowing complete RFID tag reads.

Detailed Description of First Embodiment

The embodiments shown in FIGS. 1 through 6 show the vertically movable antenna mounts (6), sliding on their risers (5), each with two antennas (4) for interrogating the RFID tags on cases on pallets on the forks.

The apparatus is mounted on its own pallet guard frame (3) (also known as a load backrest) and rests on the forks (2) or (11) of the pallet conveyance vehicle (1) or (10). The pallet guard frame (3) may have support feature (28) which spaces the frame (3) off of the ground high enough for the forks (2,11) to pass below. The apparatus may come to rest on the forks (2, 11) by driving or otherwise moving the pallet conveyance vehicle such that the forks (2, 11) move below the pallet guard frame (3), and slightly raising the forks (2, 11) if necessary, depending on the clearance between the forks (2,11) and the pallet guard frame (3). Alternatively, the apparatus may be moved into place over the forks (2, 11) while the pallet conveyance vehicle is kept stationary by sliding the apparatus on the support features (28). The support features (28) may be spacers made from metal or some other material chosen for its strength and friction characteristics. The support features (28) may also be wheels or rollers to facilitate movement of the apparatus. The apparatus may be removably secured to the pallet guard (44) of the forklift (1), or it may be secured to the battery compartment (13) of the motorized pallet jack (10), or to any structure located at the base of the forks. Any type of mechanical arrangement may be used to hold the apparatus in place, with the weight of the apparatus carried by the forks (2)(11) of the conveyance. Since the apparatus is removably installed on the forks (2, 11) it may be easily removed by reversing the installation process. The RFID reading apparatus is not integral to the pallet conveyance vehicle, instead, one or more RFID reading apparatuses may advantageously be removably installed as desired on the forks (2, 11).

Figure 4:
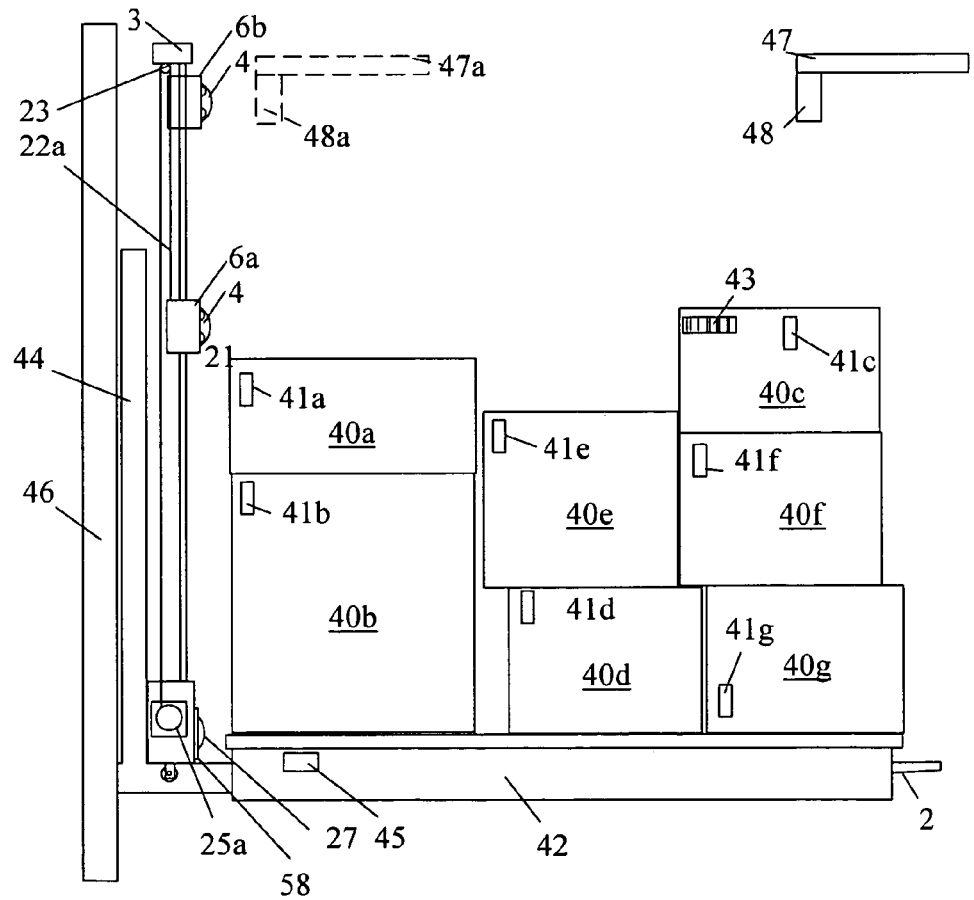
FIG. 4 shows a side-view diagram of an embodiment of an RFID reading apparatus removably installed on the forks of a pallet jack.
Figure 3A:
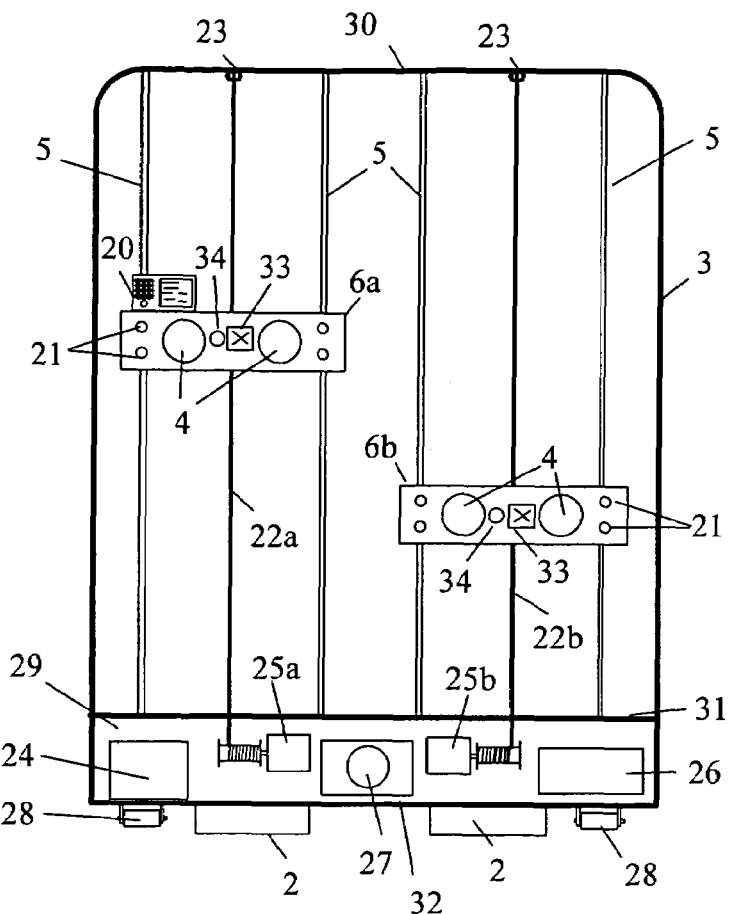
FIG. 3A shows a front-view diagram of an embodiment of an RFID reading apparatus removably installed on the forks of a pallet jack.
Figure 3B:
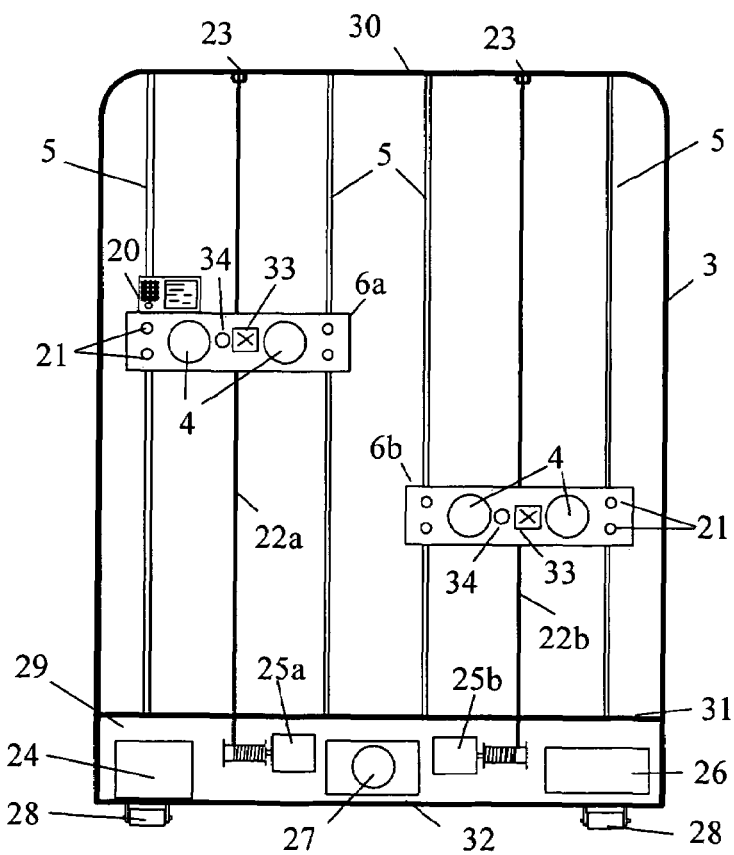
FIG. 3B shows a front-view diagram of an embodiment of an RFID reading apparatus.

FIGS. 3A, 3B, and 4 show a simplified drawing of an embodiment of the apparatus of the invention. FIG. 3A illustrates an embodiment of the apparatus removably installed on the forks (2) of a pallet conveyance. Since the apparatus is a self-contained RFID reading apparatus which may easily be installed or removed from the pallet conveyance, FIG. 3B illustrates the embodied apparatus of FIG. 3A detached from the pallet conveyance. Although other figures may depict the RFID reading apparatus as installed on a pallet conveyance for the sake of explaining the environment in which the RFID reading apparatus operates, it should be clearly understood that the RFID reading apparatus is self-contained and separate from the pallet conveyance.

The pallet (42) is lifted by the forks (2) of the pallet conveyance (1) or (10). A pallet guard (44) is a part of the pallet conveyance, attached to and moving with the forks (2). The pallet guard (44) prevents the pallet (42) and any cases stacked on the pallet from moving into the lift rails (46) and lifting mechanism of the conveyance.

Frame (3) provides a structure on which the apparatus of the invention is constructed, with the guide rails (5) running between a top rail (30) and a middle rail (31). Pulleys (23) can be mounted on the top rail (30), for cables (22a)(22b) controlling the height of the antenna mounts (6a)(6b). Middle rail (31) and bottom rail (32) form a compartment for mounting the operational components of the invention, such as control unit (26), RFID interrogator (24), pallet antenna (27), motors (25a) and (25b), and possibly batteries or power supplies or other components, as needed. As previously described, frame supports (28) may be mounted on the bottom rail (32) in order to provide easy access for the forks (2) to pass below the frame (3) when removably installing the RFID reading apparatus. In this embodiment, the frame supports are illustrated as wheels (28), which may allow the frame to be moved easily from conveyance to conveyance, or to be removed for service or storage.

The preferred embodiment shown in these figures has two antenna mounts (6a) and (6b), aligned with the left and right sides of the pallet (42) on the forks (2), although it will be understood that one or more antenna mount assemblies could be provided within the teaching of the invention. The antenna mounts (6) are independently movable on risers (5) from a lower base level at or near the level of the pallet (42), up to a top level which is preferably above the highest (40e) of the cases (40a)–(40g) which are piled on the pallet (42). Preferably, the top level is about 80 inches (203 cm) above the base (pallet) level.

Each antenna mount (5) has one or more antennas (4) for interrogating RFID tags (41a)–(41g) on the cases (40a)–(40g), and also one or more object sensors (21) for sensing the proximity of objects aligned with the sensors. Preferably, each mount has two antennas (4). The antennas on the right and left side of the pallet will help determine if a case is on the pallet or off. Software algorithms, such as reading a RFID tag multiple times with both antennas will determine whether a tag is on the pallet or just adjacent to it. The combination of manual and automatic feedback will further confirm that the right merchandise was loaded.

The object sensors (21) near the antennas (4) are used to determine the height of the cases (40a)–(40g) loaded on the picked pallet (42) and will keep the antennas (4) several inches above the highest layer (40c). Thus, as new cases (40c) are loaded, the RFID tags (41c) of the new cases will be visible to the antennas (4).

In certain circumstances of warehouse picking, some cases may have a RFID transponder and others may not. Having a bar code reading apparatus will help identify cases that do not have a RFID transponder or that have a defective RFID transponder. Therefore, preferably, there is also a bar code reader (33), which could be a digital camera imager or a laser bar code scanner, mounted next to the object sensors (21) and antennas (4) on each antenna riser. Because the vertically movable antennas maintain a line of sight to the newly added cases, this will allow the bar code scanner to work properly. Preferably, a motion sensor (34) is mounted next to the barcode reader (33), which is used to trigger the barcode reader.

Figure 6:
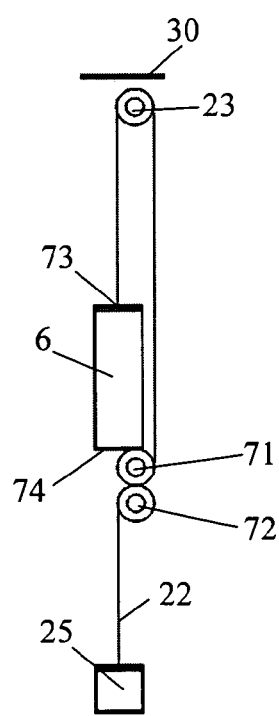
FIG. 6 illustrates an embodiment of a cable management arrangement for use with an RFID reading apparatus.

FIG. 6 shows a preferred embodiment of a cable management scheme for minimizing problems with the cables (22) running between the movable antenna mounts (6) and the motor (25), interrogator (24) and controller (26).

The cable (22) from the movable antenna mount (6) exits from the top section (73) of the mount (6). It goes up and through a pulley (23) at the top rail (30). It then comes down to the bottom (74) of the antenna mount (6), where it goes through two pulleys (71)(72). Using this arrangement of pulleys will allow a fixed length cable to be used as the antenna mounts move up and down.

An optional fifth antenna (27) can be mounted adjacent to the pallet (42) on top of the forks (2) in or on the equipment compartment (29). This fifth antenna (27) can be used to read a pallet tag (45), if one is used, when the forks (2) engage the pallet (42). This antenna (27) can also read shelf tags, if they are used, when the pallet is loaded into a storage area of the warehouse.

A user interface (20) having a display which is visible to an operator while loading the pallet conveyance, as well as preferably a keypad for input and an audio output, is used to communicate with the operator, confirming that the cases the operator has loaded are the correct ones, and tracking the inventory loaded on the conveyance. The illustrated location of the user interface (20) is not to be considered restrictive, and other locations may be preferred in other embodiments, depending on the application. The keypad and display should be visible and available to the operator at the point of activity, during the loading of the pallet. The operator will immediately see that the wrong case was loaded and can take corrective action. Finding out that the wrong cases were loaded when the operator gets back into the cab could make the operator reluctant to go out and change the cases, fearing more time will be lost.

The interface (20) will preferably be mounted on top of or inside one of the movable antenna mounts (6), fully visible while the operator is loading cases. This will allow the operator to get immediate feedback that the RFID tags of the cases that were just loaded have been read and correctly identified by the device. The user interface (20) also may be used as part of a warehouse management system (not shown) that tells an operator what products to load onto the pallet (42). In some embodiments, the audio output of the user interface (20) may be used as part of a text-to-speech system to vocally inform the operator what needs to be loaded. The audio output may be from a speaker coupled directly to the user interface (20) or wirelessly to a headset worn by the operator. The RFID reading apparatus will know when a case has been added to the pallet, and will be able to compare the information locally with the requested case. Alternatively, the data can be provided to the warehouse management system where it may be compared remotely. In this way, the operator will not be responsible for reading all or part of a bar code as confirmation, and expensive voice-recognition equipment and software may not be necessary, or their use may be reduced, as part of the warehouse management system.

Block Diagram

Figure 5:
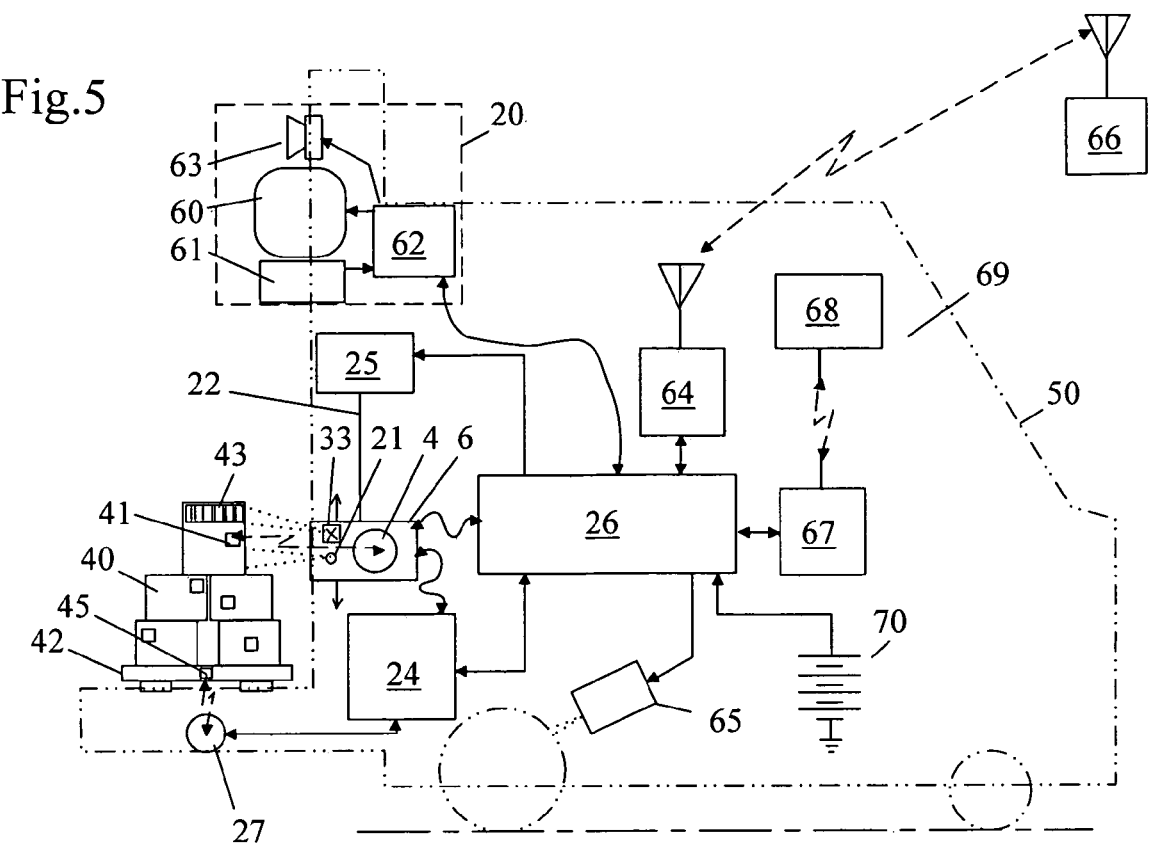
FIG. 5 shows a block diagram of the interconnection of the parts of an embodiment of an RFID reading apparatus.

FIG. 5 shows a block diagram of the invention.

Controller (26) communicates with the various components of the invention, as well as controlling the lift motors (25) for positioning the antenna mounts (6).

The user interface (20) includes display (60), and preferably keypad (61) and audio output (63). The interface may be controlled by its own computer (62), or the interface control might be built into the main controller (26).

Interrogator (24) provides the radio-frequency (RF) transmitter and receiver to send signals to antennas (4) (and (27), if so equipped), and thus to the RF transponders (RFID) tags)(41) and (45), and to receive responses from the tags (41)(45) through antennas (4) and (27). The interrogator (24) may also contain encoder/decoder and control logic, so that the main controller (26) will receive decoded data. Alternatively, this logic may be included as part of the main controller (26) itself.

The controller (26) receives signals from the object sensors (21), and also from the barcode reader (33), if the apparatus is so equipped.

In a preferred embodiment, a pallet conveyance vehicle motion sensor (65) will also be part of this invention. The motion sensor (65) will determine when the conveyance is in motion, and will send signals to the controller (26) accordingly.

The main controller (26) can interface to the infrastructure system of the warehouse (66) via a wireless link (64). This link can be the industry standard 802.11 a/b/g, or any other wireless communication system that might be desired. The controller (26) can also communicate through a short range wireless system (67), such as Bluetooth®, to a vehicle radio computer (VRC) (68) in the cab (69) of the forklift (50). However, the apparatus will have most of the functionality of a VRC and can reduce the overall cost by eliminating the VRC. The infrastructure system of the warehouse may include the warehouse management system referred-to above with regard to the voice output of the user interface (20).

Preferably, the apparatus will be powered by rechargeable batteries (70) and may be recharged at night or when the forklift is not in use. Alternatively, the invention can run off the electrical system of the forklift.

Detailed Description of Second Embodiment

Figure 7:
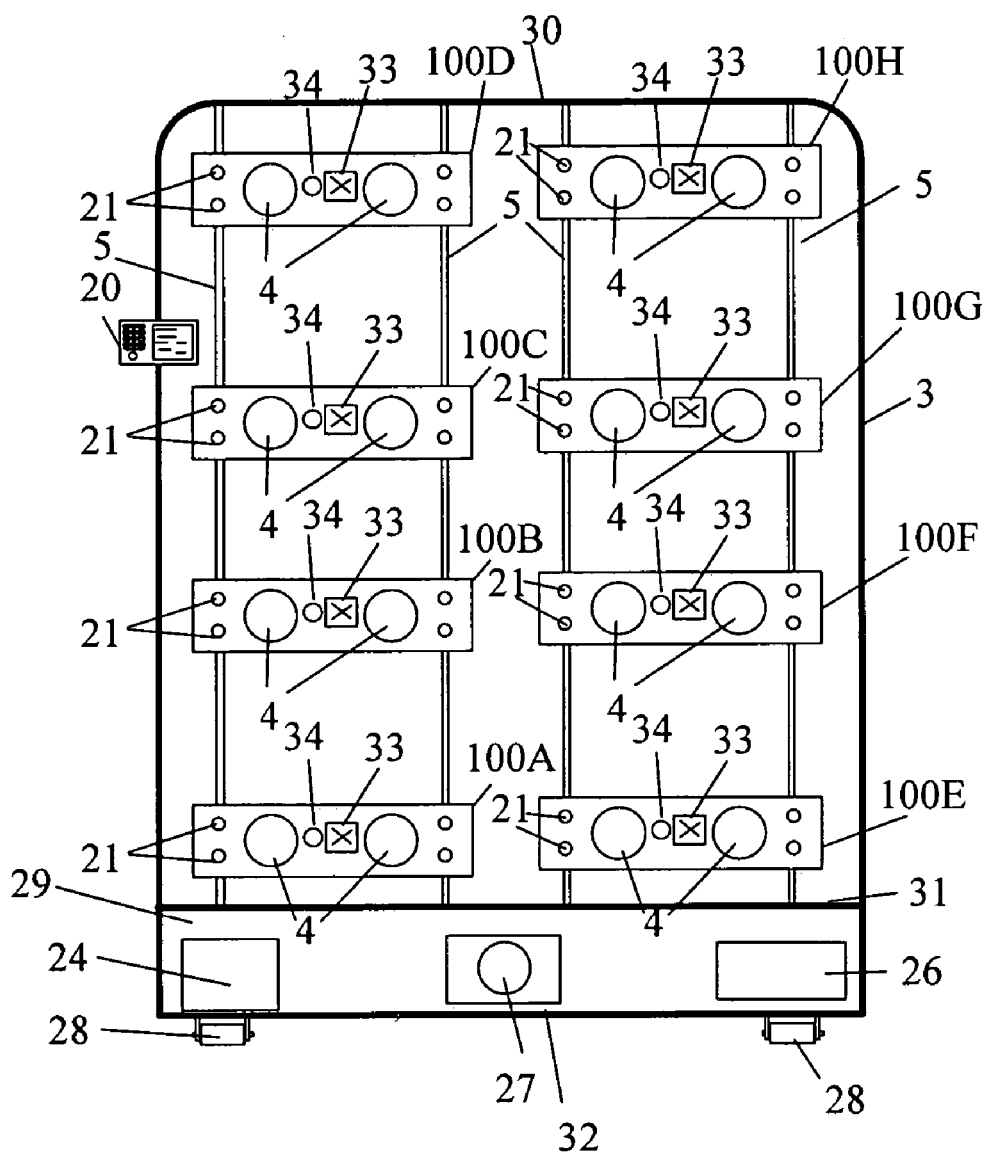
FIG. 7 shows a front-view diagram of an embodiment of an RFID reading apparatus.
Figure 8:
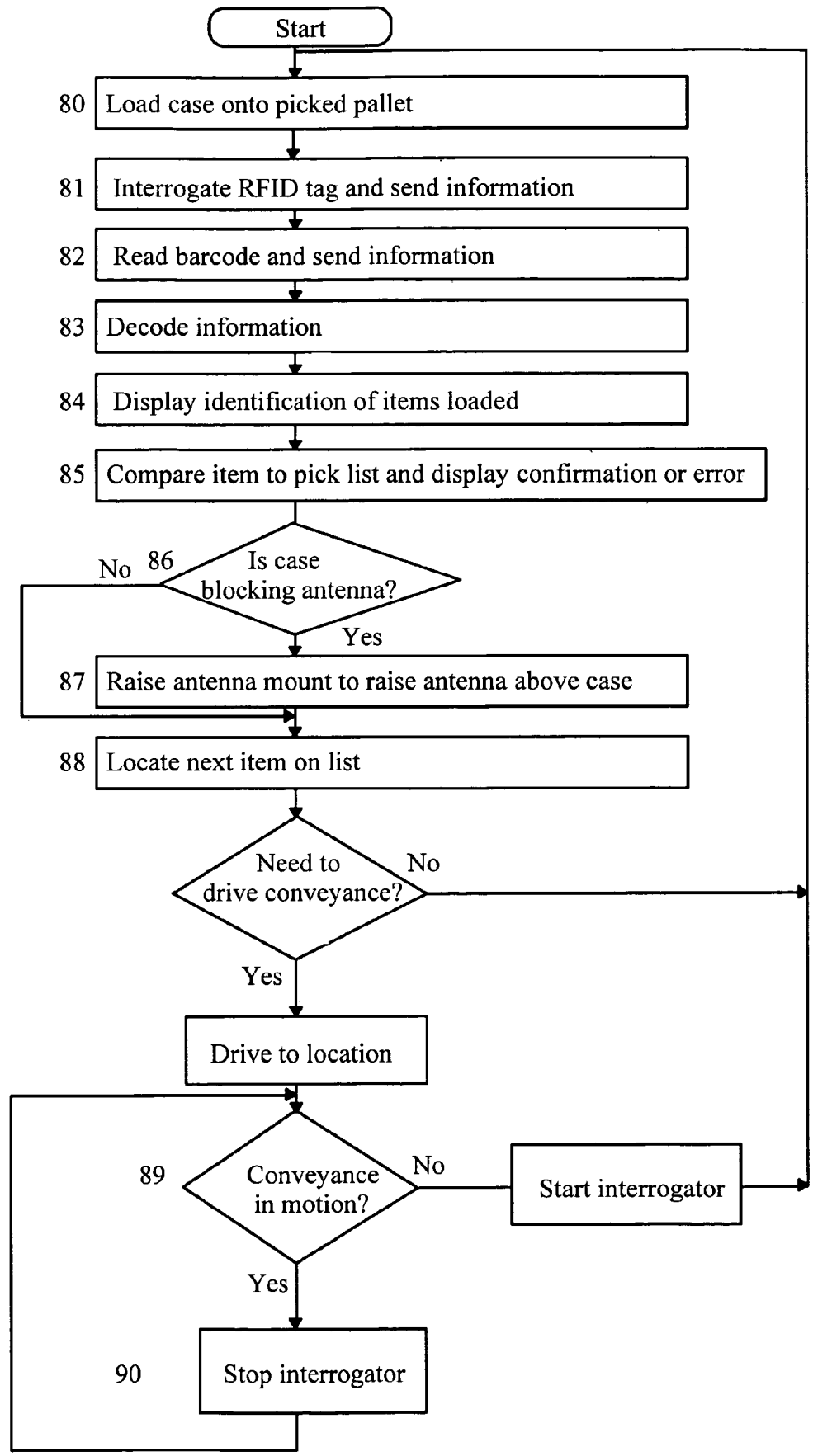
FIG. 8 shows a flowchart of an embodiment of a method of the invention.

FIG. 7 schematically illustrates another embodiment of an RFID reading apparatus. Previously, the moveable antenna mounts (6), were physically moveable. In the embodiment of FIG. 8, the antenna mounts (100A–100D) are moveable not in a physical sense, but in a logical sense. Each antenna mount (100A–100D) may be arranged into an array of antennas mounts which are spaced at different heights. The spacings between the antenna mounts may be equal or different. This embodiment also shows a second array of antenna mounts (100E–100H), although it will be understood that only one array of logically moveable antenna mounts could be provided within the teaching of the invention. Additionally, although four antenna mounts are illustrated in an array of antenna mounts in this embodiment, any plurality of antenna mounts could be used in an array of antenna mounts in other embodiments.

Each antenna mount (100) is fixedly attached to the frame (3), and has one or more antennas (4) for interrogating RFID tags (41a)–(41g) in the cases (40a)–(40g), and also one or more object sensors (21) for sensing the proximity of objects aligned with the sensors. Preferably, each mount has two antennas (4). The antennas on the right and left side of the pallet will help determine if a case is on the pallet or off. Software algorithms, such as reading a RFID tag multiple times with both antennas will determine whether a tag is on the pallet or just adjacent to it. The combination of manual and automatic feedback will further confirm that the right cases were loaded.

The object sensors (21) near the antennas (4) are used to determine the height of the cases (40a)–(40g) loaded on the picked pallet (42) and will help determine, logically, which antennas (4) the controller (26) should be paying attention to. Thus, as new cases (40c) are loaded, the RFID tags (41c) of the new cases will be visible to the object sensors (21) and the nearest antennas (4) may be read. In some embodiments, all of the antennas (4) will be turned on all of the time, but the controller (26) will logically decide which antennas to read. In other embodiments, antennas may be turned off until the object sensors (21) determine that it is appropriate to switch an antenna on. Antennas may be cumulatively switched on within an array, or only the antenna at the highest sensed level may be turned on while the others are switched off. Thus, the embodiment of FIG. 7 provides for moving antenna mounts through logical means.

The other features of the embodiment in FIG. 7 operate similarly to those in the embodiments of FIGS. 3A–3B. This RFID reading apparatus may be removably installed on a pallet conveyance vehicle as described previously.

Flowchart of Method

FIG. 8 shows a flowchart of a method embodiment of the invention, which uses the apparatus embodiments described above. Paragraph numbers below refer to the numbered steps in the flowchart of FIG. 8.

The method typically starts with an empty pallet. The antenna mounts are at-the base level, and, preferably, the interrogator is "on", ready to read an RFID tag. In the embodiment having physically moveable antenna mounts, this means the antenna mounts have been physically lowered. In the case of the logically moveable antenna mounts, this can mean only the antennas on the lowest mounts have been switched on or are being read by the controller.

80. The operator loads the case (or possibly more than one case) (40e) onto the picked pallet (42) preferably with the RFID transponder (41e) facing the antenna (4).

The bar code (43) that identifies the contents of the case (40e) will preferably also be located on the same face of the case as the RFID transponder (41e) (for the purposes of FIG. 4, these are shown facing the viewer, but it will be understood that they would preferably face the antenna (4) and barcode reader (33)).

It will be understood that in some circumstances, instead of starting with an empty pallet and placing a case on the empty pallet, the method may start out by picking up a pallet which is already partially full. As an example, imagine that a full pallet was received from a manufacturer. In this situation the contents of the pallet are known to the warehouse database. The database will also know the cases that were removed from the pallet in previous picking operations. The apparatus of the invention will know the identification of the pallet by reading the pallet transponder (45) (if one is present) with fixed antenna (27), and communicating with the warehouse computer to determine the contents of the pallet, or (in the case of the physically moveable antenna mounts) by reading the cases that face the antennas as the antennas travel vertically to get to the top of the load and associating the cases with a known pallet already in the warehouse database. In the case of the logically moveable antenna mounts, the antennas on the plurality of antenna mounts may be progressively activated to determine the contents of the pallet.

In such a situation, this step of "loading a case" will comprise putting the partially loaded pallet having one or more cases loaded upon it on the pallet support of the conveyance. The cases on the pallet are determined by the process described above to load the identifications of the case(s) expected to be loaded on the pallet. The method can then proceed with the following steps.

86 & 87. If the object sensor (21) senses that the a new object is blocking the antenna (4) (presence of a new object), then (step 82), in embodiments with a physically moveable antenna mount, the controller (26) controls the motor (25) to raise the antenna mount (6) until the antenna (4) is positioned to read the transponder (41) on the next case (40). In embodiments with a logically moveable antenna mount, the antenna on the antenna mount (100) which is closest to the new object will be switched on and/or read so that the new transponder may be interrogated and read in further steps.

81. The interrogator (24) interrogates the RFID tag (41) on the case (40), and the information from the tag is sent to the controller (26)

82. If the apparatus is so equipped, a motion sensor (34) next to the barcode reader (33) can trigger the barcode reader (33) to either take a picture of the newly added case or scan the case with a laser beam, and the barcode information is also sent to the controller.

83. The controller software will decode the information from the RFID tag (and bar code). If necessary, and if the apparatus is so equipped, the controller (26) may communicate through the wireless link (64) with the warehouse computer (66) to translate the information, coordinate the picking, or other tasks.

84. The display (60) in the user interface (20) will display information to allow the operator to confirm that the case picked was a correct one. It is important to note that the display should show the actual items loaded, such as "case of soap—24 count", rather than just the RFID tag number. The display may be programmed to show the total number of items and possibly the corresponding RFID tags read since the picking operation was started. It may also show the total number of items and possibly the corresponding RFID tags read since the conveyance last stopped. It may also show the cases that need to be picked during this stop of the conveyance as a 3D graphic with the cases disappearing as they are added to the picked pallet.

In the situation indicated in step 80, above, where the initial loading comprised picking up a partially loaded pallet, the identity of the cases whose transponders and/or barcodes face the antennas can be read and confirmed as indicated here. It is possible that the transponders or barcodes on some cases on the pre-loaded pallet might not be visible to the antennas or barcode readers, in which case the display could indicate which cases were not detected and have the operator visually confirm that they are there.

85. Optionally, the controller (26) may compare the case picked with a pick list, to be sure that the case was intended to be picked, and can display messages and/or initiate an audible alarm to the operator if there has been an error, or, alternatively, can display a confirmation on the display and/or through an audible means.

88. The operator locates the next item on the pick list, drives the conveyance to another location if needed, and repeats the method from step (80), above.

89 & 90. With the conveyance in motion, detected by motion detector (65), the apparatus controller (26) will stop the interrogator (26) from reading case tags to prevent extraneous reads. Picked case loading only occurs when the conveyance is stopped and the RFID reader will be activated to read case tags during that time. When the conveyance is in motion, the interrogator can also be used to read shelf tags or truck tags, in order to perform other warehouse operations such as pallet pick, pallet put away and truck loading and unloading.

Pallet Put-Away

Referring to FIG. 4, when the last case is added to the pallet, the WAREHOUSE MANAGEMENT SYSTEM knows the picking process is complete. It can then assign a put away location or a staging location. The antennas (4) on antenna mounts (6a) and (6b) will remain at the top of the load (40a)–(40g) during put away. The RF power is turned up to the maximum during vehicle travel, and, optionally, at least one antenna mount (6b) may be raised to the top of travel. This allows the reading of overhead shelf tags (48) on shelves (47) as the pallet is loaded into the storage bin.

As the pallet is put away into a location directed by the WAREHOUSE MANAGEMENT SYSTEM, the apparatus will read the shelf tag (48) as it closes in on the shelf location. When the pallet is fully in the bin location, the antennas (4) on mount (6b) are right up against the shelf tag (48a) on the shelf (47a), confirming unambiguously that the pallet is in the right location. If the operator directs the put away, the WAREHOUSE MANAGEMENT SYSTEM will automatically pick up the location of where that pallet was placed by the information contained in the shelf tag.

Pallet Movement

When the forks (2) engage a pallet (42), the pallet engagement sensor (58) will detect this condition. The antennas (4) on mounts (6) will rise to the top of the load for the physically movable antennas or the antennas will be switched in sequence for the logically movable antennas. Cases facing the antennas will have their tags read allowing the warehouse management system to identify the pallet. The present pallet location will be read from the shelf tag (48). As the pallet is moved to a new bin location, the warehouse management system will confirm the new location by reading the new shelf tag.

Pallet Floor Drop Location Tracking

Sometimes an operator will move a pallet through the warehouse and will need to drop it in an aisle either for staging or to perform a more urgent task. When the pallet is dropped in an aisle, most warehouse management systems lose track of that pallet. If the warehouse is very large, the pallet can become lost until it is manually entered back into the system.

When a pallet is moved using the apparatus, the antennas are always over the top of the load with a clear line of sight to the shelf tags. The shelf tags become location markers within the warehouse. If the pallet is dropped in an aisle, the apparatus determines that by an object sensor in that detects the presence of a pallet on the forks. The last shelf location read will be logged as the location where the pallet drop occurred. The warehouse management system now knows within several feet of where the pallet was dropped instead of anywhere within the warehouse.

Truck Loading and Unloading

It is assumed that trucks will have an RFID tag located about a third of the way down one of the door frames but always on the same side. As the forklift picks up the pallet, the antennas will rise to the top of the load for the physically movable antennas or the antennas will be switched in sequence for the logically movable antennas, and the RF power will be turned up to maximum. The truck tag will be read by the outside antenna on one of the antenna mounts.

The warehouse management system will verify that the truck loaded was the right one. Bay tags can be installed in case some trucks do not have tags. The bay tags will confirm to the warehouse management system that the pallet arrived at the right bay with the expectation that the correct truck is waiting.

For truck unloading, the conveyance engages the pallet within the truck, the antennas will rise to the top of the load for the physically movable antennas or the antennas will be switched in sequence for the logically movable antennas. During that process cases facing the antennas will be read. The warehouse management system will identify the pallet through those cases and will correlate the pallet with an advanced shipping notice (ASN) that was received from the supplier.

Multiple Pallet Configuration

Figure 9:
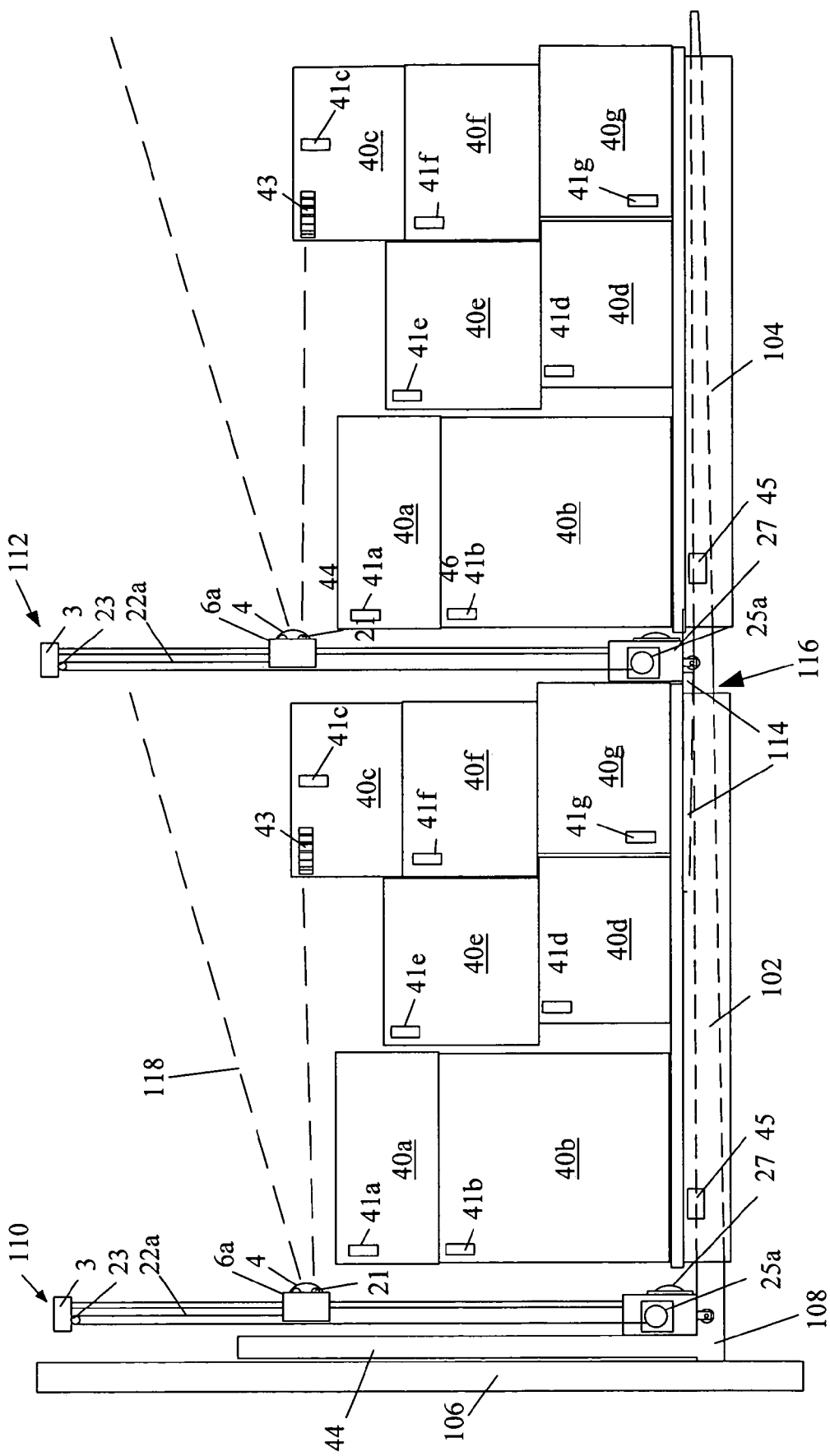
FIG. 9 illustrates an embodiment of a plurality of RFID reading apparatus removably installed on the forks of a pallet truck.

Due to the fact that the RFID reading apparatus is self-contained, easily installable, and easily removable, more than one RFID reading apparatus may be used in a multiple pallet configuration on an extended length fork pallet truck. FIG. 9 illustrates such an embodiment. FIG. 9 shows two pallets (102, 104) in a front-to-back configuration carried on a partially illustrated pallet, truck (106) with extended length forks (108). This configuration may be used by store distribution centers for faster picking. A first RFID reading apparatus (110) may be removably installed on the pallet truck (106) as described above. A second RFID reading apparatus (112) may be removably installed between the first pallet (102) and the extended length forks (108) by use of a mounting accessory (114), such as a reverse fork. The mounting accessory (114) may be coupled to the back of the second RFID reading apparatus (112), extending from the back of the second RFID reading apparatus (112). The pallet truck (106) would have the first apparatus (110) mounted on the base of its forks (108). The mounting accessory (114) of the second RFID reading apparatus (112) would be inserted into the front (116) of the first pallet (102). Then, the second pallet (104) would be placed onto the extended forks (108) after the first pallet (102) and the second RFID reading apparatus (112). The pallet truck (106) would engage both pallets (102, 104) with the second RFID reading apparatus (112) in the middle. When both pallets (102, 104) are raised, the mounting accessory (114) would be wedged between the forks (108) of the truck (106) and the first pallet (102), keeping the second RFID reading apparatus (112) firmly between the two pallets (102, 104). Each RFID reading apparatus (110, 112) would then read the RFID tags of the cases that were loaded on its own pallet (102, 104). Although this embodiment shows extended forks sized to carry two RFID reading apparatuses and two pallets, respectively, other embodiments may be sized to carry any plurality of RFID reading apparatuses and their corresponding number of pallets. The frame (3) of each RFID reading apparatus (110, 112) may be made of metal, and therefore may be designed to prevent the first RF signal (118) from the first RFID reading apparatus (110) from penetrating to the second RFID reading apparatus (112). Alternatively, the signal strength of a given RFID reading apparatus could be designed to be ineffective beyond the size of a typical pallet.

Stand Alone Application

Figure 10:
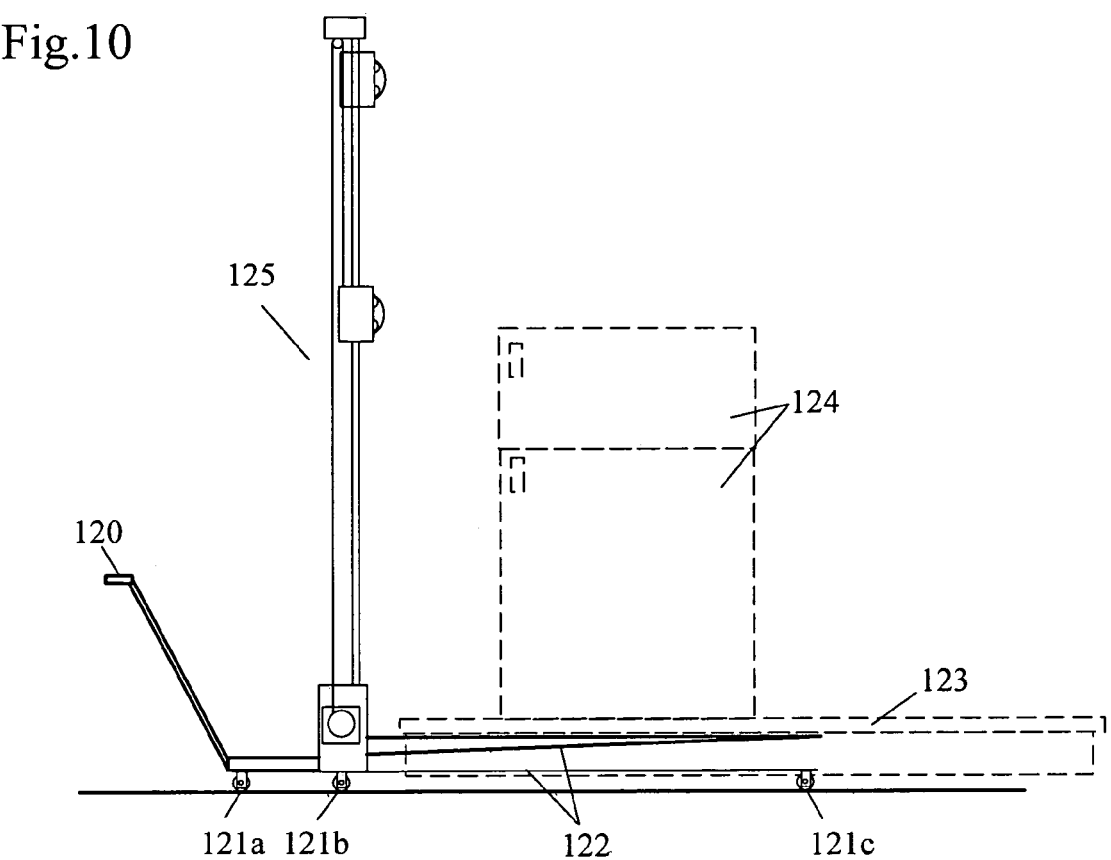
FIG. 10 illustrates usage with a stand alone pallet without a conveyance.
Figure 11:
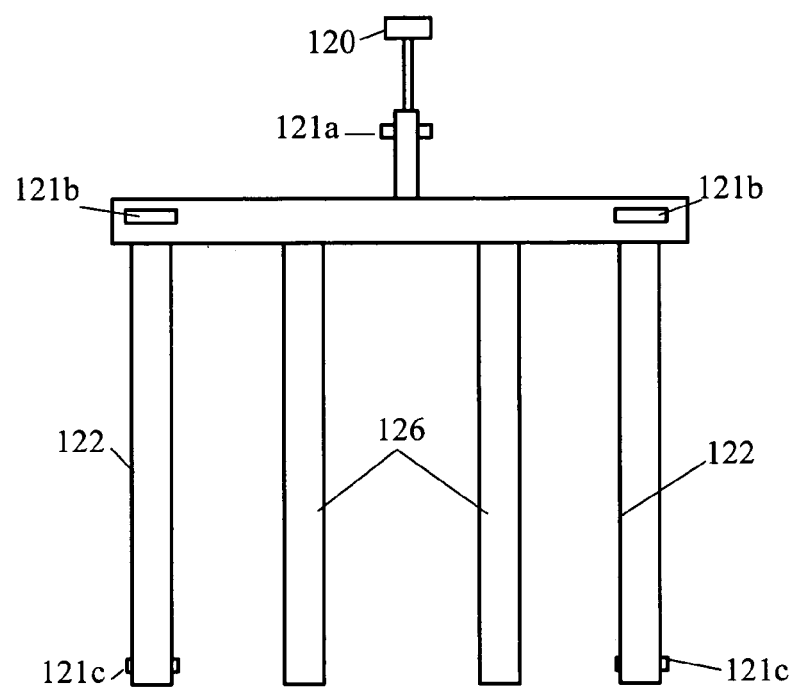
FIG. 11 Shows the mounting adapter for use in a dual pallet configuration and in a stand alone configuration

FIGS. 10 and 11 show an embodiment of the invention (125) being used with a stand alone pallet (123) without a conveyance, with FIG. 10 being a side view and FIG. 11 being a top view. The invention may be moved by a folding handle (120), and is supported by wheels (121a) on the handle (120) mount, (121b) under the apparatus and (121c) on the outer stability rails (122). Inner wedge rails (126) hold the pallet (123) in place. Because the apparatus is self-contained, easily installable, and easily removable, it may be used by itself without a conveyance.

As an example of this usage, a store distribution center may receive a pallet of cases from a manufacturer. That pallet will get broken down into several pallets that will be sent to different stores. Using the mounting adapter (FIG. 11) of the dual pallet configuration, the apparatus (125) may be inserted into a stand alone pallet (123) and remain in a vertical position. The apparatus (125) will read the tags of all cases (124) that are placed on the pallet (123) to which it is attached.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An RFID reading apparatus, comprising:
   a) a frame;
   b) an RFID interrogator, coupled to the frame, for triggering transponders in picked cases and receiving and decoding replies;
   c) at least one vertically movable antenna mount coupled to the frame;
   d) at least one antenna mounted to the antenna mount and coupled to the interrogator;
   e) at least one object sensor adjacent to at least one antenna; and
   f) a control unit coupled to the interrogator for initiating interrogation of transponders and accepting decoded replies, to the antenna mount for controlling the level of the antenna mounted on the mount, and to the object sensor for detecting the presence of cases adjacent to the object sensor.

2. The RFID reading apparatus of claim 1, wherein:
   the at least one vertically movable antenna mount coupled to the frame comprises a physically movable antenna mount which is slideably coupled to the frame; and
   the control unit controls the level of the antenna mounted on the antenna mount by physically moving the antenna mount.

3. The RFID reading apparatus of claim 1, wherein:
   the at least one vertically movable antenna mount coupled to the frame comprises a plurality of logically movable antenna mounts which are fixedly coupled to the frame; and
   the control unit controls the level of the antenna mounted on the antenna mount by logically switching on one of the antennas on the plurality of antenna mounts.

4. The RFID reading apparatus of claim 1, in which there are four antennas.

5. The RFID reading apparatus of claim 1, in which each antenna mount has an object sensor mounted adjacent to its antenna, and the level of each antenna mount is adjustable independently.

6. The RFID reading apparatus of claim 5, in which there are two antennas on each mount.

7. The RFID reading apparatus of claim 1, further comprising a fixed antenna mounted on the frame, configured to interrogate a pallet, and coupled to the interrogator.

8. The RFID reading apparatus of claim 1, further comprising a computer having a user input, a visual display and control input and output coupled to the control unit.

9. The RFID reading apparatus of claim 8, in which the computer is programmed to display a number of items and transponders read.

10. The RFID reading apparatus of claim 8, in which the computer is programmed to display at least one pick location.

11. The RFID reading apparatus of claim 8, in which the computer has an audio output, and the computer is programmed to provide audio feedback when an RF transponder is read.

12. The RFID reading apparatus of claim 8, in which the computer has an audio output comprising a voice output.

13. The RFID reading apparatus of claim 8, in which the computer is coupled to the control unit using wireless communications.

14. The RFID reading apparatus of claim 1, further comprising a motion sensor for determining when the RFID reading apparatus is moving.

15. The RFID reading apparatus of claim 1 further comprising a wireless communication transceiver for communicating with a warehouse infrastructure system.

16. The RFID reading apparatus of claim 1, in which the frame further comprises a plurality of support features for spacing the frame off of a floor surface.

17. The RFID reading apparatus of claim 16, wherein the support features comprise wheels.

18. The RFID reading apparatus of claim 1, further comprising a barcode reader mounted on the antenna mount adjacent to, and aligned with, the object sensor, and coupled to the controller.

19. The RFID reading apparatus of claim 1, further comprising a mounting accessory coupled to the frame for removably installing the RFID reader to a picked pallet conveyance already carrying another RFID reading apparatus and a pallet.

20. The RFID reading apparatus of claim 19, wherein the mounting accessory comprises a reverse fork.

21. A method of identifying picked cases having RF identification transponders while the cases are loaded on a picked pallet conveyance having a pallet support for conveying the picked cases, the method comprising the steps of:
  a) removably installing an RFID reading apparatus onto the pallet support of the picked pallet conveyance, the RFID reading apparatus comprising:
    i) a frame;
    ii) an RFID interrogator, coupled to the frame, for triggering transponders in picked cases and receiving and decoding replies;
    iii) at least one vertically movable antenna mount coupled to the frame;
    iv) at least one antenna mounted to the antenna mount and coupled to the interrogator;
    v) at least one object sensor adjacent to at least one antenna; and
    vi) a control unit coupled to the interrogator for initiating interrogation of transponders and accepting decoded replies, to the antenna mount for controlling the level of the antenna mounted on the mount, and to the object sensor for detecting the presence of cases adjacent to the object sensor;
  b) loading a picked pallet onto the pallet support of the picked pallet conveyance;
  c) loading a case onto the picked pallet with the RF identification transponder facing the antenna;
  d) interrogating the transponder in the case, and sending information from the transponder to the control unit;
  e) decoding the information from the transponder;
  f) communicating information regarding items loaded via a user interface;
  g) if there are more cases to be picked, repeating the method from step (c).

22. The method of claim 21, wherein the picked pallet at step (b) comprises an empty pallet.

23. The method of claim 21, wherein the picked pallet at step (b) comprises a pallet with picked cases.

24. The method of claim 21, in which step (f) further comprises the steps of comparing the case picked with a pick list, and communicating a message if there has been an error.

25. The method of claim 21, wherein communicating information regarding items loaded via a user interface comprises communicating with an action selected from the group consisting of:
  using a speech engine to vocally communicate with an operator;
  using a text display to visually communicate with the operator; and
  using an audible display to focus the operator's attention on a text message.

26. The method of claim 21, in which step (f) further comprises the steps of comparing the case picked with a pick list, and communicating a confirmation if the case is on the pick list.

27. The method of claim 21, in which the RFID reading apparatus further comprises a barcode reader aligned with the object sensor, and the method further comprises the step, after step (d), of reading barcode information from the case, and step (e) further comprises decoding the barcode information.

28. The method of claim 27, in which the apparatus further comprises a motion sensor adjacent to the barcode reader, and the step of claim 27 is initiated when the motion sensor detects motion.

29. The method of claim 21, further comprising the step, after step (e) of communicating through a wireless link with a warehouse computer.

30. The method of claim 21, further comprising:
  h) after step (b), removably installing a second RFID reading apparatus onto the pallet support of the picked pallet conveyance; and
  i) after step (h), loading a second picked pallet onto the pallet support of the picked pallet conveyance.

31. The method of claim 21, wherein:
  the vertically movable antenna mount is physically moveable and slideably coupled to the frame; and
  the object sensor detects if the case is blocking the antenna, and if the case is blocking the antenna, physically moving the antenna mount until the antenna is positioned to read a transponder on a next case to be loaded.

32. The method of claim 21, wherein:
  the at least one vertically movable antenna mount is logically movable and comprises a plurality of fixed antenna mounts coupled to the control unit which may be switched on and off; and
  the object sensor detects if the case is blocking the antenna, and if the case is blocking the antenna, logically moving the antenna mount by switching off a first antenna located on a first antenna mount and switching on a second antenna located on a second antenna mount so that the second antenna is positioned to read a transponder on a next case to be loaded.

33. The method of claim 21, further comprising the steps, when the picked pallet conveyance is moving, of:

raising at least one antenna mount to a raised position;

switching the RF interrogator to a high power condition;

interrogating mounted transponders as they come in range of the interrogator;

reporting an identity of a mounted transponder to a warehouse management system.

34. The method of claim 33, where the mounted transponder is a shelf transponder.

35. The method of claim 33, where the mounted transponder is mounted on a truck or trailer.

* * * * *